March 31, 1931.   J. M. MOORE   1,798,483
DAY AND NIGHT LICENSE PLATE FOR MOTOR VEHICLES
Filed Aug. 14, 1929
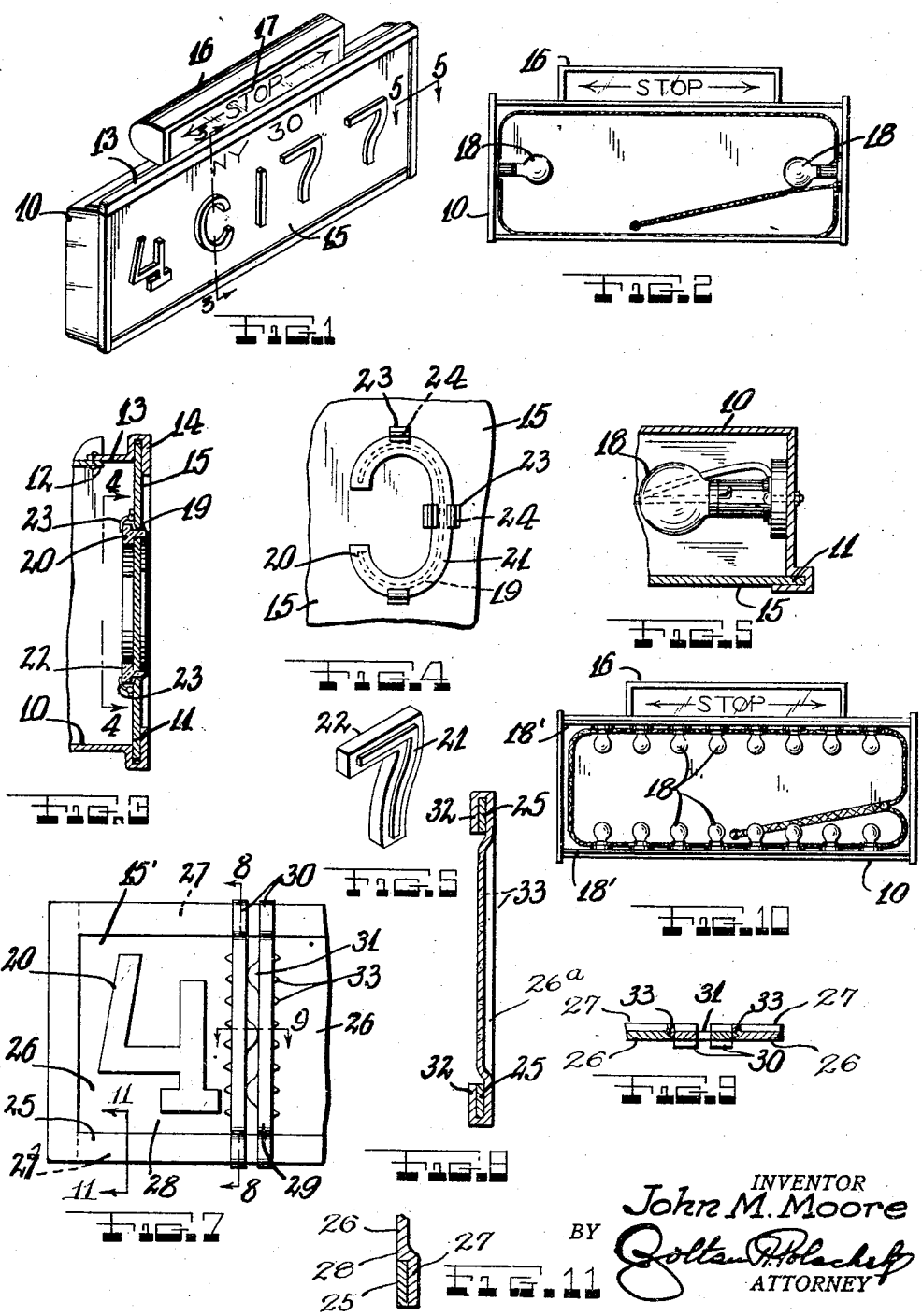
INVENTOR
John M. Moore
BY
ATTORNEY Patented Mar. 31, 1931

1,798,483

UNITED STATES PATENT OFFICE

JOHN M. MOORE, OF NEW YORK, N. Y.

DAY AND NIGHT LICENSE PLATE FOR MOTOR VEHICLES

Application filed August 14, 1929. Serial No. 385,788.

This invention relates to new and useful improvements in a day and night license plate for motor vehicles.

The invention proposes improvements in a metal license plate with glass inserted symbols, and means for illuminating the symbols from the rear, the symbols being removably mounted on the plate so as to be replaceable in the event of breakage.

As may be easily understood, the arrangement for the replacing of the symbols must be positive, not bulky and possess strength. Structures used before this invention have been found not to answer these requirements and the features of this invention are intended to eliminate these deficiencies.

The invention also proposes the provision of a device of the class mentioned which is of simple and durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a device constructed according to this invention.

Fig. 2 is a front elevational view of Fig. 1 shown with the license plate removed.

Fig. 3 is a fragmentary vertical sectional view taken on the line 3—3 of Fig. 1.

Fig. 4 is a fragmentary rear elevational view of a portion of the license plate seen looking in the direction of the arrows 4—4 of Fig. 3.

Fig. 5 is a fragmentary horizontal sectional view taken on the line 5—5 of Fig. 1.

Fig. 6 is a perspective view of a symbol used in the device.

Fig. 7 is a fragmentary front elevational view of a license plate of modified form for use in the device.

Fig. 8 is a vertical sectional view taken on the line 8—8 of Fig. 7.

Fig. 9 is a horizontal sectional view taken on the line 9—9 of Fig. 7.

Fig. 10 is a similar view to Fig. 2 showing a different arrangement of illumination.

Fig. 11 is a fragmentary vertical sectional view taken on the line 11—11 of Fig. 7.

The reference numeral 10 indicates generally a casing of rectangular shape when viewed from the front and having an opened front closed by a license plate as hereinafter fully described. The sides and bottom of the casing at the front edges are bent for forming a passage 11 for receiving the license plate just mentioned. The top of the casing is of smaller length than the sides and bottom as may be seen from an inspection of Fig. 3 where reference numeral 12 indicates the ending of the top so that the license plate may be inserted into the passage 11 thru the top. A cover strip 13 is detachably mounted upon the top of the casing 10 and is formed with a front bent edge 14 for engaging the top edge of a license plate. Reference numeral 15 indicates the license plate in place in the casing.

A top auxiliary casing 16 is secured upon the top of the casing 10 and is also opened at its front, and closed by a stop sign 17. Lamps are arranged within this auxiliary casing for illuminating the stop sign as is conventional. Lamps 18 are arranged within the casing 10 for illuminating the rear side of the license plate 15.

The license plate 15 consists of a metal plate formed with cut-out symbol portions 19 and glass symbols 20 engaged in the cut-out portions. The glass symbols 20 have front groove-engaging portions 21 for engaging in the cut-outs 19 and large bases 22 for engagement against the rear side of the plate. A plurality of clips 23 are fixed upon the rear side of the plate and have hinged lip portions normally urged against the large bases 22 of the symbols by coaxial springs 24 for holding the symbols against displacement. In Fig. 6 a detail perspective view of one of the symbols has been shown for clearly illustrating the front groove-engaging portion 21 and the large base 22.

In Figs. 7, 8 and 9, a license plate 15' has been illustrated composed of a frame section 25 and a plurality of plate sections 26 mounted within the frame. Each of the plate sections 26 is provided with one symbol 20 arranged as described in the preferred form. The top and bottom edges of each of the sections have strip portions 27 engaging against the rear side of the frame 25 and bent rearwards from the central portions 28 which are engaged in the same plane as the plane of the frame section 25. Catching devices 29 are arranged between adjacent plate sections 26 for holding these sections in place on the frame.

Each of the catching devices consists of an adjacent pair of rods 30 held slightly spaced by springs 31 and formed at their tops and bottoms with hook portions 32. These hook portions engage about the arms of the frame section 25. The central portions of the pair of rods 30 are bowed forwards as illustrated in Fig. 8 so as to be aligned in the same plane with the plane of the frame section 25. A plurality of pegs 33 project from the outer edges of the pair of rods 30 and engage in edge apertures of the plate sections 26 for holding these sections against displacement.

Any one of the sections 26 may be removed by first pressing together the spaced rods 30 so that the pegs 33 disengage from the apertures in the plates and then bowing out the central portions of the rods 30 so that the catch device may be slid along the frame 25 on the hook ends 32. Then the particular section 26 may be removed from the frame section 25.

In Fig. 10 a plurality of electric bulbs 18 may be placed in sockets mounted on a pair of horizontal strips of board 18' or the like. By means of this arrangement it is possible to maintain any desired density of illumination within the casing 10.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A day and night license plate for motor vehicles, comprising a frame, sign sections with symbols engageable in the frame and consisting of a forward bent central portion within the frame and top and bottom edges against the rear of the frame, and means mounted on the frame and between each of the sign sections for holding the sign sections in place.

2. A day and night license plate for motor vehicles, comprising a frame, sign sections with symbols engageable in the frame and consisting of a forward bent central portion within the frame and top and bottom edges against the rear of the frame, and means mounted on the frame and between each of the sign sections for holding the sign sections in place, said means comprising a spaced pair of rods resiliently connected with each other and slidably mounted on the frame, and pegs projecting from the sides of the rods and engaging into apertures formed in the sign sections.

3. A day and night license plate for motor vehicles, comprising a frame, sign sections with symbols engageable in the frame and consisting of a forward bent central portion within the frame and top and bottom edges against the rear of the frame, and means mounted on the frame and between each of the sign sections for holding the sign sections in place the sign sections being formed with symbol cut-outs and the symbols with front groove-engaging portions disposed in the cut-outs.

In testimony whereof I have affixed my signature.

JOHN M. MOORE.